United States Patent
Fialkow

(10) Patent No.: US 11,928,322 B2
(45) Date of Patent: *Mar. 12, 2024

(54) SYSTEM AND METHOD FOR HANDLING OVERLAPPING OBJECTS IN VISUAL EDITING SYSTEMS

(71) Applicant: Wix.com Ltd., Tel Aviv (IL)

(72) Inventor: Roni Fialkow, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,695

(22) Filed: Nov. 2, 2020

(65) Prior Publication Data
US 2021/0049318 A1 Feb. 18, 2021

Related U.S. Application Data

(63) Continuation of application No. 16/266,197, filed on Feb. 4, 2019, now Pat. No. 10,824,793.
(Continued)

(51) Int. Cl.
*G06F 3/04845* (2022.01)
*G06F 3/0481* (2022.01)
(Continued)

(52) U.S. Cl.
CPC ........ *G06F 3/04845* (2013.01); *G06F 3/0481* (2013.01); *G06F 16/958* (2019.01);
(Continued)

(58) Field of Classification Search
CPC .... G06F 3/04845; G06F 40/14; G06F 40/166; G06F 16/958; G06F 3/0481; G06F 2203/04803
See application file for complete search history.

(56) References Cited

U.S. PATENT DOCUMENTS 8,682,712 B2 * 3/2014 Khopkar ................. H04L 67/22
705/14.25
8,972,879 B2 3/2015 Migos
(Continued)

FOREIGN PATENT DOCUMENTS

JP 2013541061 A 11/2013

OTHER PUBLICATIONS

Corbett, "Toolbox Tip: User PowerPoint's Selection Pane to Organize Objects on a Slide". Internet article, Jan. 12, 2015 (Jan. 12, 2015) Retrieved on Jun. 7, 2019 (Jun. 7, 19) from <https://www.td.org/insights/toolbox-tip-use-powerpoints-selection-pane-to-organize-objects-on-a-slide> entire document.

*Primary Examiner* — Tuyetlien T Tran
(74) *Attorney, Agent, or Firm* — HEIDI BRUN ASSOCIATES LTD.

(57) ABSTRACT

A webpage editor which supports user editing of webpages of a website building system includes at least one processor and a unit running on the at least one processor. The webpages have visually isolated components and overlapped components and visually obscured components. The unit includes an input method handler, a visual editor and an editor overlap handler. The input method handler receives the user selected point or region of the webpage from an input device. The visual editor changes the view of the components proximal or interacting with a user selected point or region of a webpage, from a webpage view to a webpage editing view, the webpage editing view being one of 2D, 3D or side view. The editor overlap handler adjusts the visual characteristics of the components within the webpage editing view, according to component relationships and at least one of website information, user information, object properties or activation rules.

16 Claims, 12 Drawing Sheets

Related U.S. Application Data

(60) Provisional application No. 62/647,736, filed on Mar. 25, 2018, provisional application No. 62/626,093, filed on Feb. 4, 2018.

(51) Int. Cl.
  *G06F 16/958* (2019.01)
  *G06F 40/14* (2020.01)
  *G06F 40/166* (2020.01)

(52) U.S. Cl.
  CPC ............ *G06F 40/14* (2020.01); *G06F 40/166* (2020.01); *G06F 2203/04803* (2013.01)

(56) References Cited

U.S. PATENT DOCUMENTS

| | | | |
|---|---|---|---|
| 2005/0125745 A1 | 6/2005 | Engestrom et al. | |
| 2007/0162845 A1* | 7/2007 | Cave | G06F 40/117 715/209 |
| 2007/0192695 A1* | 8/2007 | Grotjohn | G06F 3/0483 715/713 |
| 2007/0192719 A1* | 8/2007 | Chellis | G06F 3/04842 715/767 |
| 2008/0155387 A1* | 6/2008 | Yabe | G06F 40/103 715/204 |
| 2008/0163102 A1* | 7/2008 | Horiuchi | G06F 3/0481 715/781 |
| 2008/0313533 A1* | 12/2008 | Hoyer | G06F 40/103 715/243 |
| 2009/0077498 A1* | 3/2009 | Shima | G06F 40/166 715/823 |
| 2009/0309894 A1* | 12/2009 | Lam | G06F 40/103 345/582 |
| 2011/0213655 A1* | 9/2011 | Henkin | G06Q 30/0251 705/14.49 |
| 2011/0258566 A1 | 10/2011 | Oustiougov | |
| 2012/0089933 A1* | 4/2012 | Garand | G06F 8/38 715/765 |
| 2013/0124254 A1* | 5/2013 | Jafri | G06Q 10/10 705/7.26 |
| 2013/0125046 A1* | 5/2013 | Gaul | G06F 3/0484 715/790 |
| 2013/0219263 A1* | 8/2013 | Abrahami | G06F 40/103 715/234 |
| 2013/0246904 A1* | 9/2013 | Seliger | G06F 3/0484 715/234 |
| 2014/0075335 A1* | 3/2014 | Hicks | G06Q 10/10 715/753 |
| 2014/0229821 A1* | 8/2014 | Abrahami | G06F 40/143 715/235 |
| 2014/0250371 A1* | 9/2014 | Wabyick | G06F 40/10 715/243 |
| 2014/0282218 A1* | 9/2014 | Kaufman | G06F 3/0481 715/781 |
| 2014/0289650 A1* | 9/2014 | Cotlarciuc | G06F 3/0481 715/760 |
| 2015/0089354 A1* | 3/2015 | Abrahami | G06F 16/958 715/235 |
| 2015/0310124 A1* | 10/2015 | Ben-Aharon | G06F 40/186 715/205 |
| 2016/0078285 A1* | 3/2016 | Malani | G09G 5/00 345/629 |
| 2016/0342312 A1* | 11/2016 | Jiang | G06F 3/04815 |
| 2016/0350794 A1* | 12/2016 | Amrany | G06Q 30/0239 |
| 2017/0046317 A1* | 2/2017 | Geva | G06F 3/04847 |
| 2017/0090734 A1* | 3/2017 | Fitzpatrick | G06F 40/106 |
| 2017/0344656 A1* | 11/2017 | Koren | G06Q 10/101 |
| 2019/0019333 A1* | 1/2019 | Kumar | G06T 17/20 |

* cited by examiner

SYSTEM AND METHOD FOR HANDLING OVERLAPPING OBJECTS IN VISUAL EDITING SYSTEMS

CROSS REFERENCE TO RELATED APPLICATIONS

This application is a continuation application of U.S. patent application Ser. No. 16/266,197, filed Feb. 4, 2019, which claims priority from U.S. provisional patent applications 62/626,093 filed Feb. 4, 2018, and 62/647,736 filed Mar. 25, 2018, all of which are incorporated herein by reference.

FIELD OF THE INVENTION

The present invention relates to website building system generally and to component viewing and handling in particular.

BACKGROUND OF THE INVENTION

Website building systems are used by both novices and professionals to create interactive websites. Existing website building systems are based on a visual editing model and most website building systems typically provide multiple templates, with a template possibly including a complete sample website, a website section, a single page or a section of a page.

Website building system users (also known as designers, subscribers, subscribing users or site editors) may design the website and the website's end-users (the "users of users") may access the websites created by the users. Although end-users typically access the system in read-only mode, website building systems (and websites) may allow end-users to perform changes to the web site such as adding or editing data records, adding talkbacks to news articles, adding blog entries to blogs etc. The website building system may in fact allow multiple levels of users (i.e. more than two levels) and assign different permissions and capabilities to each level. Users of the website building system (in particular in the full or partial on-line configurations described below) may register in the website building system server which manages the users, their web sites and accesses by the end-users.

A website building system may be a standalone system or may be embedded inside a larger editing system. It may also be on-line (i.e. applications are edited and stored on a server), off-line or partially on-line (with web sites being edited locally but uploaded to a central server for publishing). The website building system may use an internal data architecture to store website building system based sites and this architecture may organize the handled sites' internal data and elements inside the system. This architecture may be different from the external view of the site (as seen, for example, by the end-users). It is also typically different from the way the HTML pages sent to the browser are organized.

For example, the internal data architecture may contain additional properties for each element in the page (creator, creation time, access permissions, link to templates, SEO (search engine optimization) related information etc.) which are relevant for the editing and maintenance of the site in the website building system, but are not externally visible to end-users (or even to some editing users). The website building system may implement some of its functionality (including both editing and run-time functionality) on a server or server set, and some of its functionality on client elements. The website building system may also determine dynamically whether to perform some functionality on the server or on the client platform.

A website building system typically handles the creation and editing of visually designed applications (such as a website) consisting of pages, containers and components. Pages may be separately displayed and contain components. Components may include containers as well as atomic components.

The website building system may support hierarchical arrangements of components using atomic components (text, image, shape, video etc.) as well as various types of container components which contain other components (e.g. regular containers, single-page containers, multi-page containers, gallery containers etc.). The sub-pages contained inside a container component are referred to as mini-pages, each of which may contain multiple components. Some container components may display just one of the mini-pages at a time, while others may display multiple mini-pages simultaneously.

The components may be content-less, or have internal content. An example of the first category is a star-shape component, which does not have any internal content (though it has color, size, position and some other parameters). An example of the second category is a text paragraph component, whose internal content includes the internal text as well as font, formatting and layout information. This content may, of course, vary from one instance of the text paragraph component to another. Components which have content are often referred to as fields (e.g. a "text field").

Pages may use templates, general page templates or component templates. Specific cases for templates include the use of an application master page containing components replicated in all other regular pages, and the use of an application header or footer (which repeat on all pages). Templates may be used for the complete page or for page sections. The website building system may provide inheritance between templates, pages or components, possibly including multi-level inheritance, multiple inheritance and diamond inheritance (i.e. A inherits from B and C and both B and C inherit from D).

The visual arrangement of components inside a page is called a layout. The website building system may also support dynamic layout processing, a process whereby the editing of a given component (or other changes affecting it such as externally-driven content change) may affect other components, as further described in U.S. Pat. No. 10,185,703 entitled "Website Design System Integrating Dynamic Layout and Dynamic Content" granted 22 Jan. 2019 and assigned to the common assignee of the present invention and incorporated herein by reference.

A website building system may be extended using a third party application and its components as well as list applications (such as discussed in US Patent Publication No. US 2014/0282218 entitled "Website Building System Integrating Data Lists with Dynamic Customization and Adaptation" published 18 Sep. 2014 and assigned to the common assignee of the present invention and incorporated herein by reference). These third party applications and list applications may be added and integrated into designed websites.

Such third party applications and list applications may be purchased (or otherwise acquired) through a number of distribution mechanisms, such as being pre-included in the website building system design environment, from an Application Store (integrated into the website building system or external to it) or directly from the third party application vendor.

The third party application may be hosted on the website building system vendor's own servers, the third party application vendor's server or on a 4th party server infrastructure.

The website building system may also allow procedural code to be added to some or all of the system's entities. Such code could be written in a standard language (such as JavaScript), an extended version of a standard language or a language proprietary to the specific website building system. The executed code may reference API's provided by the website building system itself or external providers. The code may also reference internal constructs and objects of the website building system, such as pages, components and their attributes.

The procedural code elements may be activated via event triggers which may be associated with user activities (such as mouse move or click, page transition etc.), activities associated with other users (such as an underlying database or a specific database record being updated by another user), system events or other types of conditions.

The activated code may be executed inside the website building system's client element, on the server platform or by using a combination of the two or a dynamically determined execution platform. Such a system is described in US Patent Publication No. US 2018/0293323 entitled "System and Method for Smart Interaction Between Website Components" published 11 Oct. 2018 and assigned to the common assignee of the present invention and incorporated herein by reference.

Typical site creation may be based on a number of models, including a visual editing model (in which the user edits a previously created site) and an automatic site generation model or a combination thereof as illustrated in FIG. 1 to which reference is now made and is described in U.S. Pat. No. 10,073,923 entitled "System and Method for the Creation and Update of Hierarchical Websites Based on Collected Business Knowledge", granted 11 Sep. 2018 and assigned to the common assignee of the present invention and incorporated herein by reference.

It will be appreciated that throughout the specification, the acronym WBS may be used to represent a website building system. FIG. 1 illustrates a system 100 that comprises a typical website building system 5 in communication with client systems operated by WBS vendor staff 61, a site designer 62 (i.e. a user), a site user 63 (i.e. user of user) and with external systems 70. Website building system 5 may further comprise a WBS (website building system) site manager 10, an object marketplace 15, a WBS RT (runtime) server 20, a WBS (website building system) editor 30, a site generator system 40 and a WBS content management system (CMS) 50. It will be appreciated that the elements of FIG. 1 may function as described in U.S. Pat. No. 10,073,923.

In the visual editing model, the user (designer) edits a site based on one or more website templates. The website building system provider may provide multiple site (or other) templates, with each template possibly including a complete sample web site, a web site section, a single page or a section of a page. Users may have the option to start with an empty site (essentially a "blank page" template) but would typically start with an actual site template.

The website building system provider may provide site templates ranging from the very generic (e.g. mobile site, e-store) through the more specific (e.g. law office, restaurant, florist) to the highly specific ones (e.g. a commercial real-estate law office or a Spanish tapas restaurant). Such templates are typically stored in a repository accessible to users of the website building system and are typically classified according to business type, sub-type or industry. Templates may also be created (and classified) according to style, color range or other parameters and not just according to business type. Site templates may be extended with additional (typically back-end) functionality, services and code in order to become full-fledged vertical solutions integrated with the website building system.

Thus, the user's first experience when creating a site using a website building system visual editor may typically be that the user chooses a template (e.g. according to style or industry type/sub-type), possibly a blank template and then edits the template in the visual editor including the editing of content, logic, layout and attributes. Such editing may include (in particular) adapting the template and its elements to the details of the user's business. The user may then publish the modified site.

Under the site generation model, the website building system generates an initial site for the user, based on a selected template, possibly modified by filling-in common elements of information, and possibly allowing follow-up editing of the generated site. This filling-in is required as various pieces of information (such as the business name or a description of the management team) are included in multiple locations in the template's pages. Thus, the user may have to change the business name (for example) in multiple places throughout the template.

Furthermore, some template elements (e.g. a generic product page) may appear multiple times, with each instance displaying the details of a different instance of an underlying entity (e.g. different products offered in the site). Such multiple instances may be manually specified (e.g. the details of different persons in the company's management team) or dynamically derived from an external database (e.g. product details from the "products on sale" database). Such an arrangement is often known as a "repeater".

The template may also include fields. For example, the website building system may allow the template designer to specify fields (also known as "placeholders") for the insertion of values inside the templates, such as {CompanyName}, {ProductName}, {ProductPrice} etc. The user may also specify the values for the fields defined in the template selected for the website.

The website building system may allow the user to enter simple or complex values (e.g. text and images), as well as additional (non-field) information such as selection of included pages or web site areas, colors, style information, links, formatting options, website display options, decoration elements (such as borders and backgrounds) etc.

The website building system may also allow the user to enter some of this additional information before selecting a template and use this information to help in selecting a template (e.g. by narrowing the set of proposed templates). For example, the user may select a certain generic color scheme (e.g. pastel colors) or style (e.g. business/formal), and the system may then use this selection to narrow the set of proposed templates.

The system may also display a series of views or questionnaires to allow the user to enter values or selections (for both the defined fields and the additional information above). The system may further create a connection (or binding) between a multiple-instance element of the template (as described herein above) and an internal or external database which provides the data instances used to generate the displayed instances.

Once a template has been selected and its fields and additional information have been specified (e.g. through the questionnaires or through binding to data sources), the website building system may generate the website containing the combined information. The user may then publish the site (through the website building system or otherwise).

A website building system may perform semi-automatic site creation using a different model as described in U.S. Pat. No. 10,073,923. Under this model, the system gathers information on the user and his web site requirements from multiple sources which may include, for example: user-filled questionnaires; existing user presence (such as existing web sites or social media presence), industry sources (such as general trade web sites), off-line information and internal system repositories which provide information on specific business types, such as basic template information for specific business types (lawyers, restaurants, plumbers, graphic designers etc.), possibly refined for specific industries (e.g. distinguishing between real-estate lawyers and personal injury lawyers).

The system may also gather external information from other sites, both internal and external to the system. Such information may affect, for example, the selection of offered questionnaires and layout elements, proposed defaults etc. Such information may also typically be collected on a statistical or summary basis, in order not to expose information belonging to any single user, and protect users' privacy, anonymity and legal rights (such as copyrights). Such information may be located based on information provided by the user which may be direct (e.g. an existing website address) or indirect (a business name and geographical address which can be used to locate information about the business).

The gathered information is analyzed and arranged into a repository of content elements which are then mapped onto layout elements which present the content from the content elements and combine the layout elements to form the site. The layout element mapping, selection and combination process may be fully automatic or semi-automatic (i.e. including user interaction).

To support the above-mentioned functionality above, a website building system will typically maintain a series of repositories, stored over one or more servers or server farms. Such repositories may typically include various related repositories such as a user information/profile repository, a WBS (website building system) component repository, a WBS site repository, a Business Intelligence (BI) repository, an editing history repository, a third party application store repository, etc. The system may also include site/content creation related repositories such as a questionnaire type repository, a content element type repository, a layout element type repository, a design kit repository, a filled questionnaires repository, a content element repository, a layout element repository, a rules repository, a family/industry repository etc. A description of these repositories may be found in U.S. Pat. No. 10,073,923.

SUMMARY OF THE PRESENT INVENTION

There is provided in accordance with a preferred embodiment of the present invention, a webpage editor which supports user editing of webpages of a website building system (WBS). The webpages have visually isolated components and overlapped components and visually obscured components. The webpage editor includes at least one processor and a unit running on the at least one processor. The unit includes an input method handler, a visual editor and an editor overlap handler. The input method handler receives the user selected point or region of the webpage from an input device. The visual editor changes the view of the components proximal or interacting with a user selected point or region of a webpage, from a webpage view to a webpage editing view, the webpage editing view being one of 2D, 3D or side view. The editor overlap handler adjusts the visual characteristics of the components within the webpage editing view, according to component relationships and at least one of website information, user information, object properties or activation rules.

Moreover, in accordance with a preferred embodiment of the present invention, the website information is editing history, business intelligence, binding to external sources for the website, creator, creation time, access permissions, link to templates or SEO (Search Engine Optimization).

Further, in accordance with a preferred embodiment of the present invention, the component relationship is semantic, hierarchical, inter-page component associations or size of overlap.

Additionally, in accordance with a preferred embodiment of the present invention, the object properties include at least one of: configuration, size, type, shape, editing history, layer arrangement/z-order, existing transparency, containment relationships, age, component type, inheritance definition, use within the page, formatting information or content.

Additionally, in accordance with a preferred embodiment of the present invention the visual characteristics include transparency, z-order, or general attributes of the components.

Further, in accordance with a preferred embodiment of the present invention, the system includes at least one repository to store the activation rules, properties of the components, the information on the user and the information on the system.

Still further, in accordance with a preferred embodiment of the present invention, the visual editor further includes a component manipulation handler to modify visual attributes of the overlapped and hidden components according to the editor overlap handler.

Moreover, in accordance with a preferred embodiment of the present invention, the component manipulation handler includes at least one of a transparency handler, a z-order handler, a 3D display handler, a general behavior handler and a side display handler. The transparency handler makes an overlapping or hiding component at least one of: transparent and semi-transparent. The z-order handler modifies or preserves the z-order between all the components of the website page. The general behavior handler changes attributes of the components according to at least one of: shape modifications, zooming, resizing, moving, clipping, dynamic layout, content changes, change in fill and color of the components. The 3D display handler converts all the components into a 3D display, and the side display handler cuts and creates a simplified side view of the components.

Additionally, in accordance with a preferred embodiment of the present invention, the input device is a mouse, a trackball, a digitizer input device, physical human motion detection, a biometric parameter reader, a 2D pointing device or a 3D pointing device.

Further, in accordance with a preferred embodiment of the present invention, the editor overlap handler includes a data gatherer, a component relationship analyzer, and a component visibility determiner. The data gatherer gathers information on all the components of the website page from at least one of: the at least one database, non-system elements or systems external to the system. The component relationship analyzer analyzes relationships between all the components of the website page and the component visibility determiner determines the activation conditions for the display of the overlapped and hidden components of the page by the visual editor according to the user selected point, the activation rules and from the output of the data gatherer and the component relationship analyzer.

There is provided in accordance with an alternative embodiment of the present invention a method for a webpage editor. The method includes enabling a user to edit a webpage of a website building system (WBS), the webpage having visually isolated components and overlapped components and visually obscured components, and also receiving the user selected point or region of the webpage from an input device. The method also includes changing the view of the components that are proximal or interacting with a user selected point or region of a webpage, from a webpage view to a webpage editing view, the webpage editing view being one of 2D, 3D or side view, and also adjusting visual characteristics of the components within a the webpage editing view, according to component relationships and at least one of website information, user information, object properties or activation rules.

Additionally, in accordance with a preferred embodiment of the present invention, the method also includes storing the activation rules, properties of the components, the information on the user and the information on the system.

Further, in accordance with a preferred embodiment of the present invention, the enabling includes modifying visual attributes of the overlapped and hidden components according to the adjusting visual characteristics of the components.

Still further, in accordance with a preferred embodiment of the present invention, the modifying visual attributes includes at least one of making an overlapping or hiding component at least one of: transparent or semi-transparent, and modifying or preserving the z-order between all the components of the website page. The method also includes changing attributes of the components according to at least one of: shape modifications, zooming, resizing, moving, clipping, dynamic layout, content changes, change in fill or color of the components, converting all the components into a 3D display, and cutting and creating a simplified side view of the components.

Moreover, in accordance with a preferred embodiment of the present invention, the adjusting visual characteristics includes gathering information on all the components of the website page from the at least one database, non-system elements or systems external to the system, analyzing relationships between all the components of the website page and also determining the activation conditions for the display of the overlapped and hidden components of the page by the enabling according to the user selected point, the activation rules and from the output of the gathering and the analyzing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
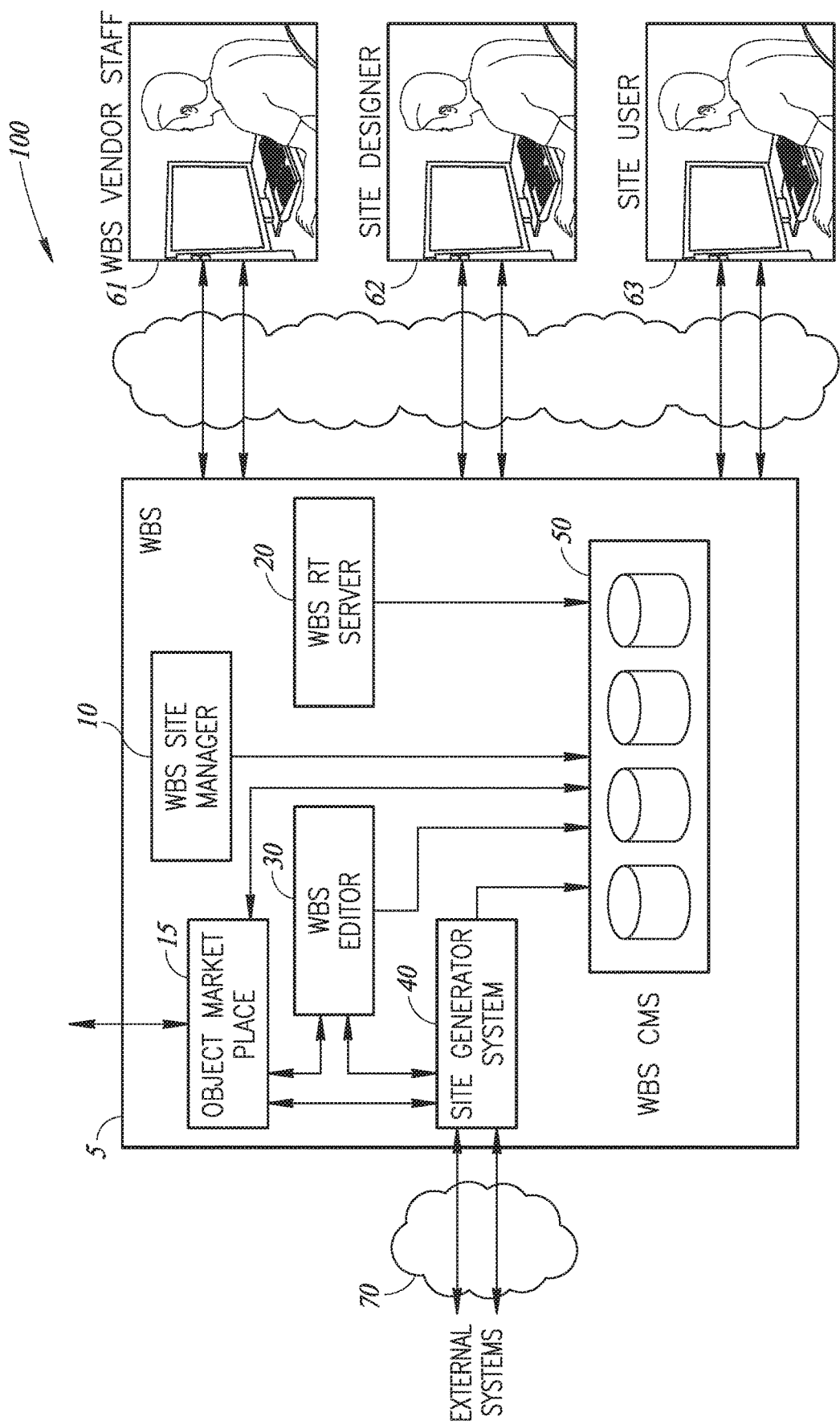
FIG. 1 is a schematic illustration of a typical representation of a website building system of the prior art and pages created using the website building system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the website building process today is a crucial part of the business development of a company and the ease with which websites may be created and edited is an important consideration when choosing a website building system. Applicant has further realized that websites and web applications are more than a mere set of data or documents or computer programs. While they do contain a fair amount of content, websites can be considered as digital replacements for many different real-world products and services, such as a newspaper, an online shop, an online university (i.e. allowing registration, payment, viewing of lectures etc.), a ticketing agency, a magazine, a photo gallery, a social gathering hall, etc. In other words, websites provide real-world experiences, from which real items (food, clothing, tickets, photographs, documents, washing machines, etc.) may be purchased and received, and which affect the creation, disposition and behavior of real world items as well as the real-world processes related to these items.

Applicant has also realized that when editing web pages and other multi-layer visual screens or designs, it is not so simple to select objects hidden or obscured (overlapping/covering) by other objects. Such selection is typically needed for a variety of editing operations such as move, resize, rotate, delete, change attributes, change z-priority, edit content, etc.

The designer of the website (also known as the user of the website building system) may be required for editing purposes to click (for example) on the overlapped object's frame, internal area or specific handles on the object's frame including possibly using different handles for different purposes. The selection may be a single object selection or multi-selection.

The overlapping object may also be much larger than the overlapped object, but may also have an identical or very similar size to the overlapped object (e.g. multiple frames, each inside the other, which have very similar sizes, or even identical sizes and just being one above the other). It will also be appreciated that the website design may include more than 2 layers, and thus multiple levels of overlapping and occlusion.

Figure 2:
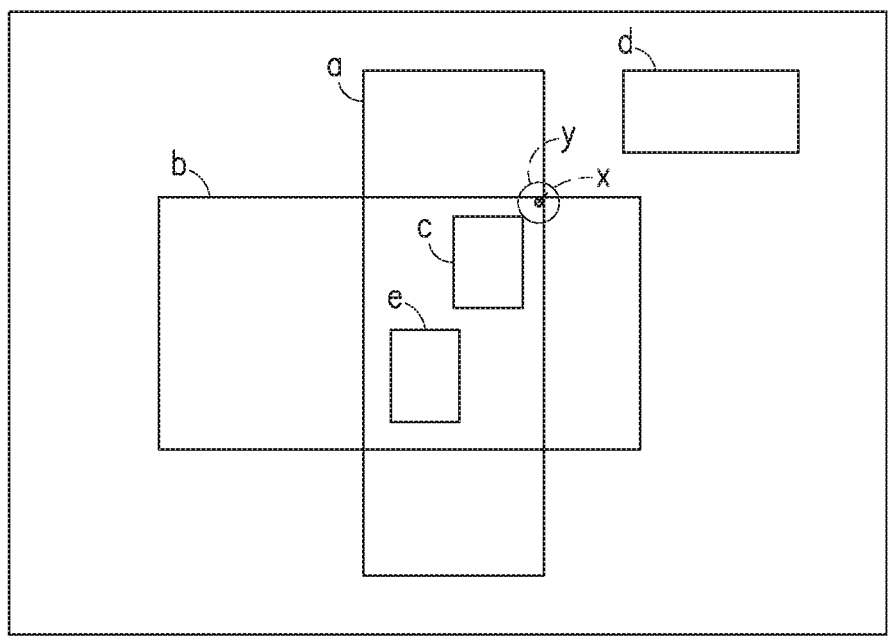
FIG. 2 is a schematic illustration of the effects of a selection sensitivity radius of the prior art.

Existing prior art systems have attempted to solve the selection problem using various means. For example, in a number of methods the user selects a desired point on the edited page (using a mouse or similar means). The selected point may have a sensitivity attribute, i.e. a radius of pixels around the selected point which captures all intersecting objects as is illustrated in FIG. 2 to which reference is now made. As is shown in FIG. 2, selecting the point [x] (for frame selection) actually selects objects whose frames or areas intersect with the circle [y], i.e. objects [a], [b] and [c] only. The distant object [d] is not selected. Neither is object [e] which is contained within object [c] but not within the radius of circle [y] and therefore is considered too far from point [x]. It will be appreciated that selection by intersecting frames and by intersecting areas may be considered two separate methods of selection and that system 200 may implement either method or both (e.g. depending on a user setting).

Existing prior art systems may also typically use the editing area display options when object selection is required using methods/behaviors such as display as usual, display in frames mode (i.e. displaying just object frames which is equivalent to 100% transparent for object fill/content), display objects as semi-transparent, display objects partially in frames or semi-transparent mode and display the object set in semi-transparent 3D showing layers (including allowing 3D rotations and panning). Other options may include select by clicking on an editing area location (which can "catch" multiple objects or frames) or marking a screen area (e.g. creating a rectangle or circle by dragging) which selects all objects intersecting the specified marked area (including hidden objects).

Figure 3:
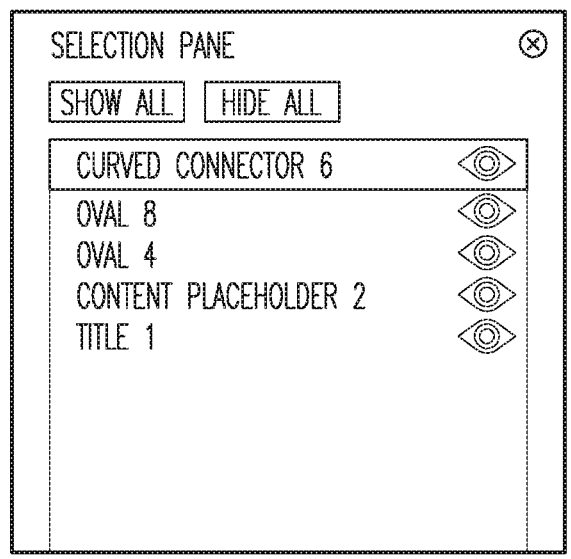
FIG. 3 is a schematic illustration of a selected component list widget of the prior art.

Once the user has selected multiple (and possibly overlapping) objects, one option (as used for example by the PowerPoint presentation program commercially available from Microsoft Inc.) is to display a list of the selected components, which will also include all overlapped or hidden components in the selection. The user may then select (single or multiple) objects from the list. This list could be displayed using a list widget, be embedded in the regular editor UI or floating next to the selected point/area. The list widget may display object details or other representation of the object (such as their thumbnails) or otherwise some kind of structural diagram of the objects in the page or a subset thereof. Reference is now made to FIG. 3 which illustrates such a selected component list widget.

A second option (used for example by AutoCad commercially available from Autodesk Inc.) is selection cycling. The selection operation selects the top-most object (i.e. "closest" to the user). Further modified selection operations (e.g. shift-select) will cycle among alternative selections, possibly highlighting them in some manner.

Applicant has further realized that a solution to the above mentioned selection deficiencies is a system that involves a methodology in which a user editing a page may select and manage a complex composition consisting of multiple components which may obscure or hide each other. The system may further reveal the overlapped object(s) when the mouse passes near the enclosing rectangle of the overlapped/hidden object(s) subject to specific activation conditions. This could be done, for example, by highlighting the outline of hidden objects, thereby revealing the hidden objects. The system may further highlight other parts of the hidden object(s) such as their fill pattern or content. The system may also reveal objects or parts thereof when the objects (or their hiding objects) are manipulated in certain ways (e.g. moved or resized). Other effects may also include optical or geometrical distortion of the objects and their layout and the use of dynamic layout. Thus the system may support the user in the selection of hidden object(s) and their manipulation.

It will be appreciated that any revealing of objects may be according to activation conditions based on pre-defined rules. The rules may be based on user activities, user information, site information or object properties including the relationship between objects on the pertinent page. Thus it will be further appreciated that the inventive system may differ from the systems of the prior art since the display behavior depends on the specific objects and various relationships between them.

The system may also limit the revealing to a given number of (z-priority) levels below the overlapping object (e.g. only 1 or only 2 levels down). Alternatively, the system may allow the gradual discovery of multiple levels, i.e. make more and more levels visible as long as the mouse stays in the relevant activating position (e.g. near the edge of the overlapping component) and/or other requirements for the activation conditions are met. Thus, the system may (for example) reveal any one-level-down components after X seconds, and then reveal another level successive level of overlapped components every Y additional seconds of mouse hovering.

It will also be appreciated that by using this ability to "discover" hidden objects, the user may "tour" further hidden objects by moving the mouse inside or near the hidden object in order to reveal further hidden objects, each of which may be highlighted and made partially visible when the mouse approaches it. It will be further appreciated that the system's response to such touring may depend on additional parameters, including the user's current behavior profile and his past behavior. Thus, for example, the revealing of objects may depend on the mouse movement speed, as it can reasonably be assumed that a user moving the mouse very rapidly is not interested in hidden objects appearing and disappearing very quickly, and therefore the user may slow the mouse movement speed once he starts touring his real "region of interest". In another example, if the user has selected (or otherwise interacted with) "deeper" objects in a given region, and has done so multiple times in the past, the system may expose such deeper objects earlier than the regular rule set would dictate.

It will also be appreciated that the system may not be limited to input selection using a mouse but may use other input devices based on different forms of input technology. Applicant has also realized that the ability of the system to work with different input devices (as described in more detail herein below) together with adjustable activation rules may be beneficial to users with limitations or disabilities that may find it hard to exactly pin point the component that they wish to edit, such as users suffering from Parkinson's disease.

Figure 4:
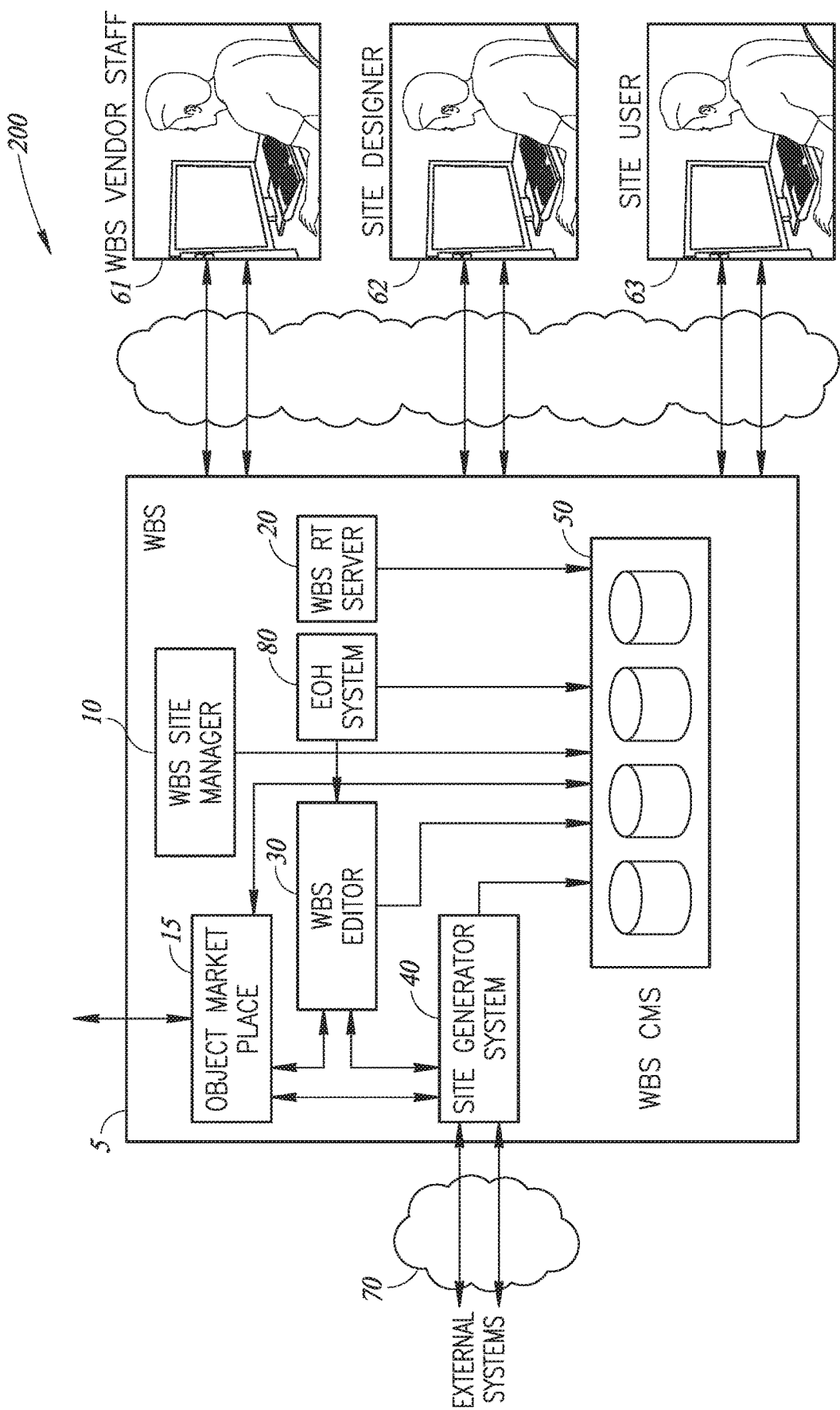
FIG. 4 is a schematic illustration of a system for handling overlapping objects in visual editing systems, constructed and operative in accordance with the present invention.

Reference is now made to FIG. 4 which illustrates a system 200 for handling of overlapping objects in visual editing systems according to an embodiment of the present invention. System 200 may comprise the elements of system 100 as described in U.S. Pat. No. 10,073,923 (as well as any sub elements) in conjunction with an EOH (editor overlap handler) system 80. System 200 may enable hidden or overlapped component visibility subject to activation conditions as described in more detail herein below.

Figure 5:
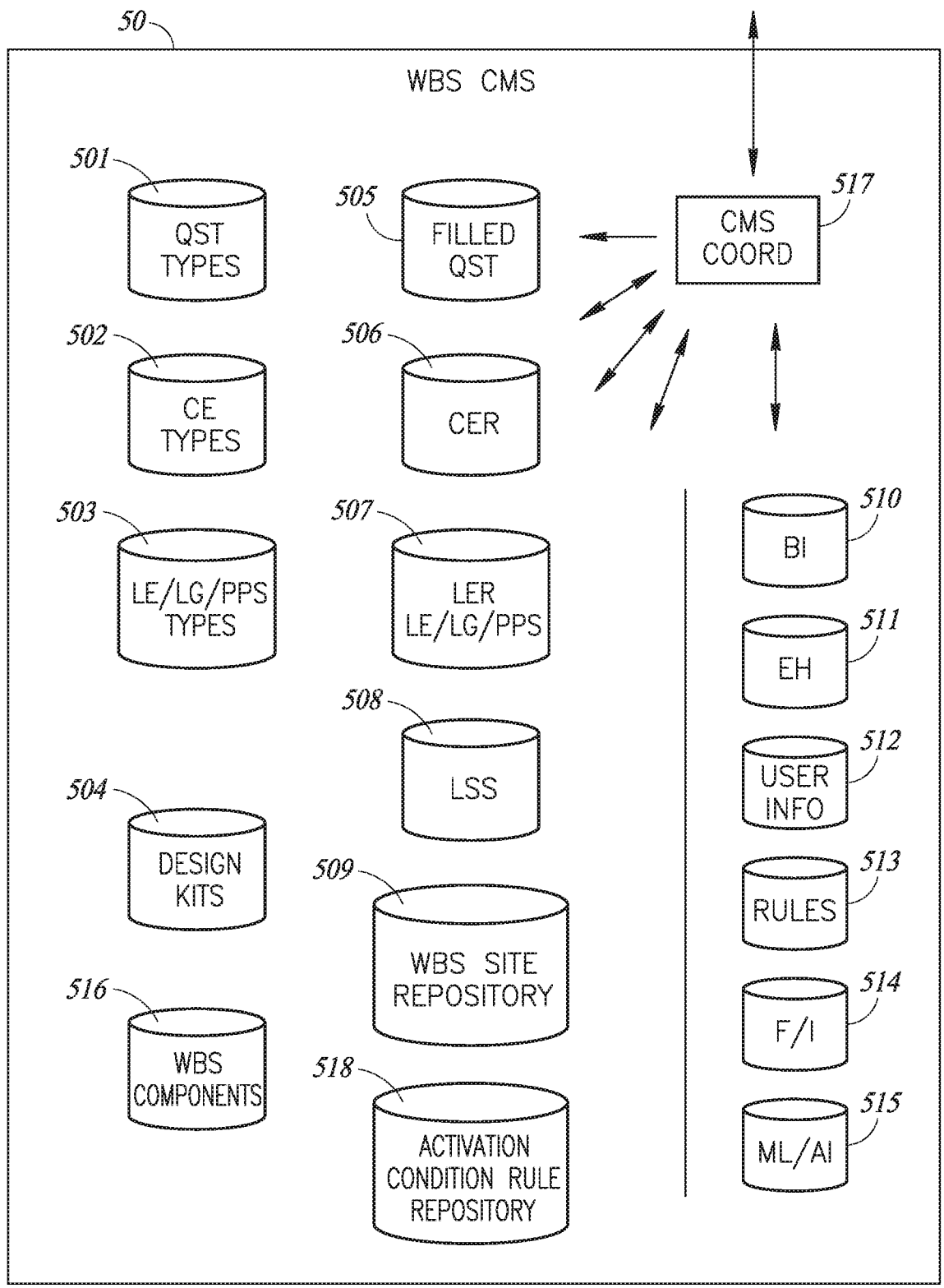
FIG. 5 is a schematic illustration of the elements of the content management system of FIG. 4, constructed and operative in accordance with the present invention.

It will be appreciated that the repositories in CMS 50 may also comprise an activation condition rule repository 518 to store activation rules together with other website building system related repositories 501-516 and CMS coordinator 517 as described in U.S. Pat. No. 10,073,923 and as is illustrated in FIG. 5 to which reference is now made. It will be appreciated that the activation rules may be pre-defined or may be adapted using machine learning and or artificial intelligent information as stored in repository 515.

Figure 6:
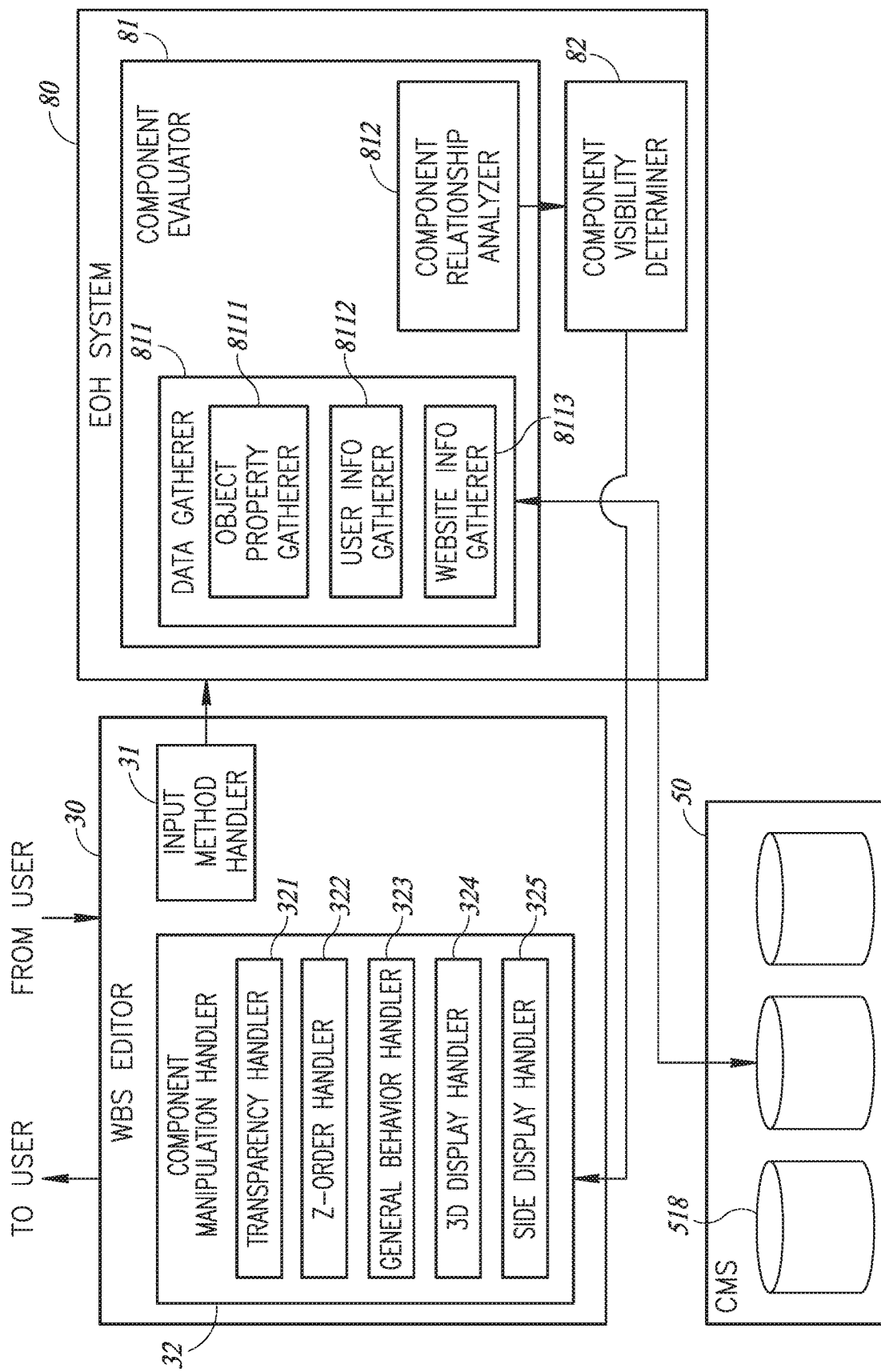
FIG. 6 is a schematic illustration of the elements and work flow of the editor overlap handler and WBS editor of FIG. 4, constructed and operative in accordance with the present invention.

Reference is now made to FIG. 6 which illustrates the elements of EOH system 80 and WBS editor 30 and their relationships. In addition to the sub components as described in U.S. Pat. No. 10,073,923, WBS editor 30 may further comprise an input method handler 31 and a component manipulation handler 32. Component manipulation handler 32 may further comprise a transparency handler 321, a z-order handler 322, a general behavior handler 323, a 3D display handler 324 and a side display handler 325. It will be appreciated that the sub elements of manipulation handler 32 may be responsible for modifications involving specific types of components attributes as described for each handler in more detail herein below.

It will be appreciated that WBS editor 30 may implement its own display infrastructure separately from the functionality of component manipulation handler 32. The display infrastructure may handle the actual display as instructed by component manipulation handler 32 (an example of this is a mobile application that does its own rendering). WBS editor 30 may also render but send the results elsewhere for actual display (e.g. in server-side rendering system where the actual rendering is done on the server). The actual display may be handled by a different element of the system or by a different machine altogether.

WBS editor 30 may also work within a platform (such as a browser) and generate and/or modify the data structure for the platform (e.g. the browser's internal DOM) which is used by the browser for actual display.

Thus based on the structure described herein above, system 200 may find it easier to resolve selection-related component changes in conjunction with other complex changes such as dynamic layout changes due to concurrent content and/or presentation changes.

It will be appreciated that component manipulation handler 32 and its sub-elements may typically handle changes in the website building system's in-memory structure maintained by WBS editor 30 during an editing session. For example, they may set a component to a transparency percentage X in order to facilitate the review of a hidden object in a similar manner in which a user may modify a component's transparency on his own.

It will be appreciated that one major difference is that the changes made by manipulation handler 32 to the WBS in-memory edit-time data structure are typically transient. This may be done, for example, by having an actual expiration timer for them, having an expiration process (i.e. they change back gradually over time) or by reverting the changes based on passage of time and/or user activity (e.g. when the user stops handling a revealed component).

It will be appreciated that from herein, the discussion on system 200 refers to the applications created by a website building system and accessed by the end-users as web sites, although system 200 may be applied to other categories of on-line applications which are accessed using specific client software (proprietary or not). Such client software may run standalone or be activated from a browser (such as the Adobe Flash plug-in). End-users may access these web sites using client software on regular personal computers and also on smart-phones, tablet computers and other desktop, mobile or wearable devices. Alternatively, system 200 may be applicable to systems which generate mobile applications, native applications or other application types as described in U.S. Pat. No. 9,996,566 entitled "Visual Design System for Generating a Visual Data Structure Associated with a Semantic Composition Based on a Hierarchy of Components" granted 12 Jun. 2018 and assigned to the common assignee of the present invention and incorporated herein by reference.

It will be appreciated that all the elements of system 200 may in general handle website building system objects or components.

Input method handler 31 may monitor and identify the position of the placement of a mouse cursor or any other input device or any specific activity made by the user when handling relevant hiding/hidden components (such as selecting them, dragging them etc.). In the discussion below we shall refer to selections being made using a mouse operating inside a visual editor. However, such selections can also be made using any other 2D or 3D pointing device, such as a trackball, a digitizer input device, a biometric parameter reader, gesture/hand motion/eye motion detection or any other device.

As discussed herein above, component manipulation handler 32 may manipulate the visibility of the components in the proximity of the mouse cursor placement according to activation conditions as determined by EOH system 80 as discussed in more detail herein below.

EOH system 80 may further comprise a component evaluator 81 and a component visibility determiner 82 to determine what and how to display hidden and overlapped components to the user based on the input selection. Component evaluator 81 may further comprise a data gatherer 811 and a component relationship analyzer 812. Data gatherer 811 may continuously gather information from WBS editor 30, the repositories of CMS 50 and other system elements (e.g. user information and interactions, website information etc.) Data gatherer 811 may also gather information from systems external to system 200 as well as from other non-system elements as described in U.S. Pat. No. 10,185,703. Component relationship analyzer 812 may analyze the changing relationships between the components on the pertinent website as described in U.S. Pat. No. 10,176,154 entitled "System and Method for Automated Conversion of Interactive Sites and Applications to Support Mobile and Other Display Environments" granted 8 Jan. 2019 and assigned to the common assignee of the present invention and incorporated herein by reference. It will be appreciated that such analysis may include off-line analysis, e.g. combining a thorough analysis made upon page saving with quicker follow-on analysis handling the changes made during editing and since the last save.

Data gatherer 811 may further comprise an object property gatherer 8111, a user information gatherer 8112 and a website information gatherer 8113. The functionality of these elements is described in more detail herein below.

Component visibility determiner 82 may determine activation conditions based on the results of component evaluator 81 together with the rules stored in activation condition rule database 518. It will be further appreciated that activation conditions may be based on object and related properties/relationships and may include but not be limited to configuration, size, position, type, shape, editing history, layer arrangement/z-order, existing transparency, containment relationships, age, inheritance definition, use within said application, formatting information and content. They may also be based on native reading order, inter-page component associations (dynamic layout anchors, detected grouping semantic or otherwise), any binding to external resources/databases (e.g. data binding), component hints from a template, user-defined hints, collected BI (business intelligence) on the use of an object, page and application (in editing or run-time context) and component/content classification (as discussed herein above in relation to U.S. Pat. No. 10,073,923) or hints provided by Site Generator System 40 or similar sources. This information may be gathered by object property gatherer 8111 or website information gatherer 8113 accordingly. Component visibility determiner 82 may also consider information related to the hidden component(s), the hiding component(s) (e.g. will not reveal components hidden by a repeater component) or other components as relevant (in the page or otherwise).

Activation conditions may also be based on user related information (as gathered by user information gatherer 8112) such as user type, user location, user industry/family and user client device info (device, OS, browser, screen size . . . ). As discussed herein above, all this information may be stored and retrieved from CMS 50 as is shown in FIG. 5 back to which reference is now made.

It will be appreciated that the discussion below references visual editing of web pages consisting of multiple components. However, it may equally apply to visual editing of interactive applications (desktop or mobile) or any type of visual editing of multi-object compositions in which objects may hide or otherwise overlap other objects as discussed herein above.

Component evaluator 81 may receive coordinates or any other input information (such as the example using cursor speed as described herein above) from input method handler 31, indicating the position of the user's cursor, as well as information about the user activities. Data gatherer 811 may gather appropriate data based on the component currently within the selected coordinates and component relationship analyzer 812 may analyze the relationship between the selected area or component and other nearby components such as their semantic relationship, hierarchy and the size of any overlap between components etc. as described herein above. For example, the user may hover his mouse above a hidden semantic group comprising a picture with a caption and according to the activation conditions both may appear. Furthermore, waiting some time will cause additional nearby caption/image pairs (which form a higher level semantic group) to appear as well.

Based on the results of component evaluator 81, component visibility determiner 82 may determine the activation conditions for the selected component and any other hidden, overlapped components in the vicinity based on pre-determined rules as discussed in more detail herein below and may instruct component manipulation handler 32 to update the visibility of any relevant proximate components and to present them to the user accordingly.

Reference is now made to FIGS. 7A, 7B, 7C and 8 which illustrate example scenarios of how overlapped/hidden components may be revealed based on different activation conditions. It will be appreciated that for FIGS. 7A, 7B, 7C and 8, the figures may use one or more types of dashed line (- - -) to illustrate a component defined in the position shown by the dashed lines, but not actually visible to the user due to being hidden (e.g. by another component).

Figure 7A:
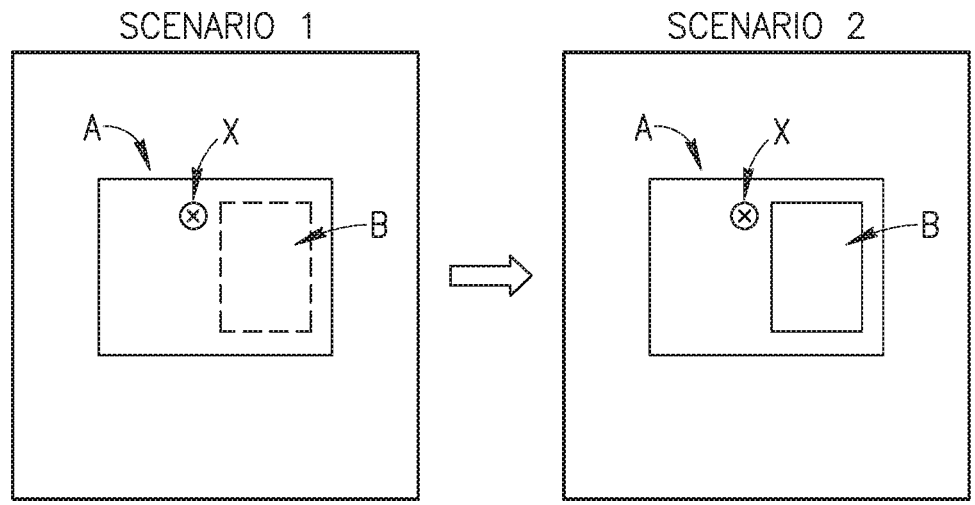
FIGS. 7A, 7B and 7C are schematic illustrations of exposure of hidden components by the system of FIG. 4, constructed and operative in accordance with the present invention.

Reference is now made to FIG. 7A. As is illustrated, component A overlaps (and hides) component B (scenario 1). When mouse [x] hovers over component A in a position which is also over B's area (or maybe just sufficiently close to B's frame), the frame of B is shown (scenario 2) according to the pertinent activation conditions. In alternative embodiments, component B can be revealed by "bringing it to the front" temporarily (as is also discussed herein below for selection) possibly using two types of z-order, a permanent one and a temporary one, by making component A semi-transparent, entirely or in a specific sub-area including or covering on B's area or frame or by applying a visual effect or other visual marking to relevant sub-areas of components A, B or both. Such a visual effect may also include animation or property animation (e.g. making component B's frame blink or component A's sub-area covering component B continuously change its color or transparency or slightly move/vibrate etc.). System 200 may use different types of visual effects or marking for different components revealed simultaneously (e.g. as the case in which touching a single hiding component reveals multiple hidden components described in more detail herein below).

The activation conditions may depend on the pre-determined activation rules stored in repository 518 such as (for example) component B being just one layer down from component A, or B being sufficiently smaller than A (for example, size(B)<70%*size(A)–per area or per each axis).

When the user clicks with the mouse, WBS editor 30 may move the viewing focus to component B, select component B and possibly move component B to the front of component A (either temporarily while it is being manipulated, or on a permanent basis). This would then allow the user to select and manipulate component B.

It will be appreciated that the manipulation of the (previously hidden) components may also affect component hierarchy. For example, assuming that component B was below component A (i.e. hidden by component A) and component A was a container, the user may then place container A over component B. In such a case, initially component B is not contained in component A (due to component A being located over component B), but if component B is moved a bit (e.g. by dragging and dropping) component B would become a member of container component A.

It will be appreciated that system 200 may support a "lock z-order" component attribute for some or all of its component types. In this case, for such a component (even if selected), z-order handler 322 (and WBS editor 30) may ensure that it does not "move to the front" or one or more layers up when manipulated after being selected, thus avoiding issues related to components changing their z-position in the set component hierarchy unintentionally. For example, under the temporary z-rank concept, the temporary z-rank may revert to the regular one (or the object be marked "having no temporary rank") under multiple conditions, such as: the user stopped manipulating the object for a given time, the user started manipulating another object, the user clicked on an unrelated position, the user interacted with other parts of the system UI, the user left the page or the user left the system (i.e. terminated the editing session). Thus the "brought to front" component would then "return to its place".

Figure 7B:
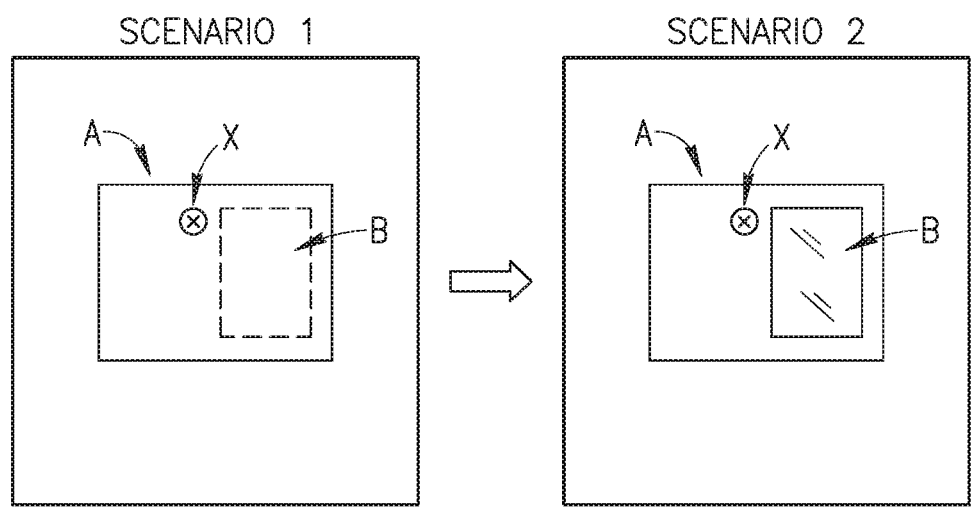

System 200 may also allow a component to be flagged with an attribute of "un-selectable when overlapped". In this scenario, system 200 may still reveal the component in some manner when the mouse hovers over it (e.g. by making the overlapping component transparent as shown in FIG. 7B scenario 2) but visibility determiner 82 may determine that the actual selection of the overlapped component is not allowed.

Figure 7C:
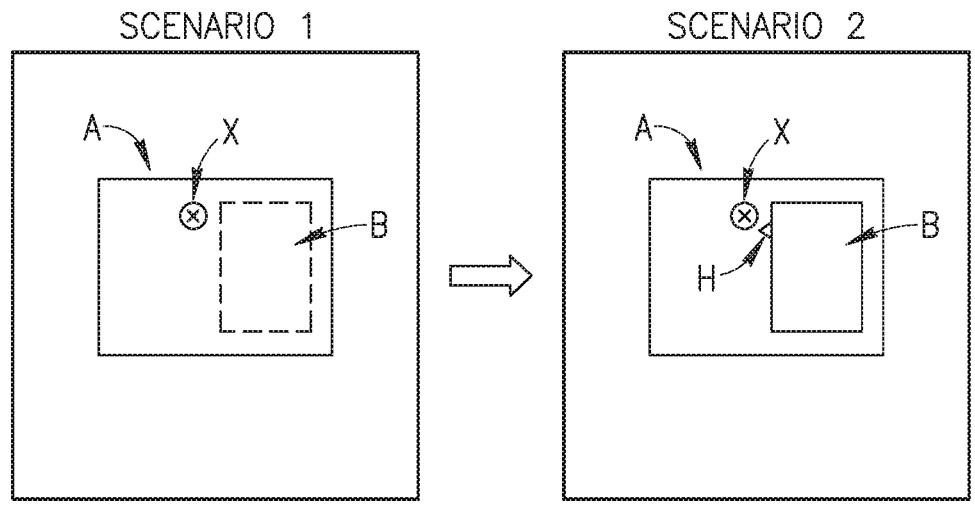

It will be appreciated that such an attribute may be modified using a regular component attribute editing UI (e.g. a property associated with the component) or a specific "unlock" UI feature associated with the z-order locked component (e.g. a button or a handle H appearing next to the component when the mouse hovers near the component, as shown in FIG. 7C, scenario 2 to which reference is now made).

It will be further appreciated that system 200 may also reveal the overlapped sections of components which are only partially overlapped (i.e. "completing them" to a complete component). Again, this may depend on the degree of overlap as measured above (e.g. if the overlap area, the intersection of components A and B (as seen in scenario 1 FIGS. 7A-7C) is "small enough" compared to A and/or large enough compared to B as based on activation rules).

In an alternative embodiment, the selection of the overlapped component B may not be performed by hovering or clicking on component B (or near component B or component B's frame) but by using an alternate method. This could be through a specialized UI element (e.g. a dedicated button, added special handle(s) or other UI component), an alternative selection method (e.g. a "shift-click" or "control-click" combination), a specific mouse gesture, or any other means. Such selection could also use specific selection areas (or specialized selection handles) associated with the relevant components possibly dynamically displayed when relevant (e.g. when the mouse nears the relevant component's frame).

Figure 8:
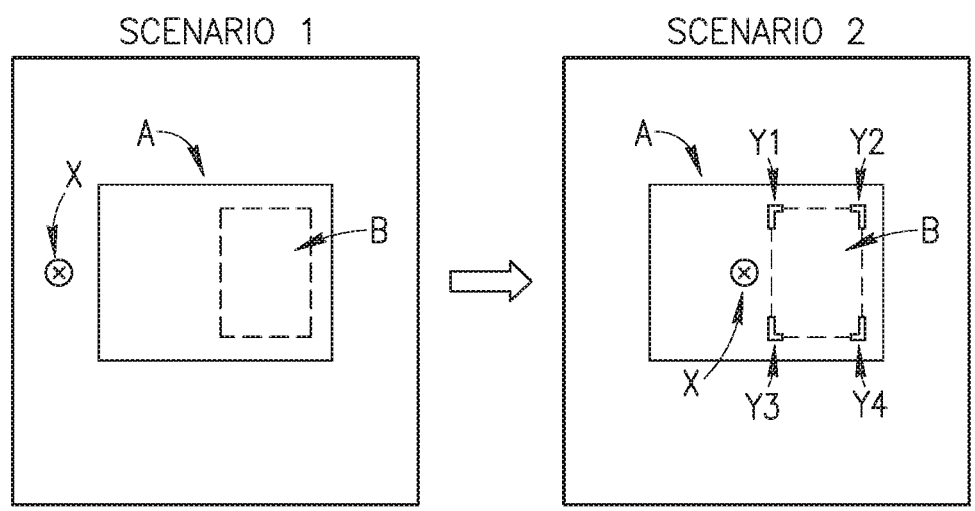
FIG. 8 is a schematic illustration of a partial exposure of a hidden component by the system of FIG. 4, constructed and operative in accordance with the present invention.

Reference is now made to FIG. 8 which illustrates a case in which component A totally hides component B. In scenario 1 the mouse [x] is not near enough to component B for the activation conditions to be met according to the activation rules, so component B remains hidden. In scenario 2, as mouse [x] approaches component B and the applicable activation conditions are met, 4 corner markers (y1, y2, y3 and y4) for component B become visible. In an alternative embodiment, these markers may serve as manipulation handles for component B (allowing component B to be moved, resized, rotated or otherwise modified). In another embodiment, the user may cause the rest of component B to appear by clicking on the handles, or by just moving the mouse near them.

In an alternative embodiment, system 200 may reveal the hidden (overlapped) element (for example component B as in FIG. 8 (scenario 1) when the mouse hovers over the overlapping component and not the overlapped component(s). Thus, when the mouse hovers near the frame (or over the internal area) of overlapping component A, all of the "sufficiently small" (as discussed herein above) components which A overlaps (and for which the activation conditions are met) are revealed. It will be appreciated that due to these activation conditions, WBS editor 30 may reveal just a subset of the components hidden by component A or overlapping component A based on the functionality of EOH system 80.

It will also be appreciated that a single user action (e.g. a mouse move) may affect multiple hiding components. For example, for an embodiment of system 200 (as described herein above) which reveals hidden components when the mouse hovers over the hiding component, if the user edits a page in which multiple hiding components slightly overlap each other in a region X, when the user places the mouse hovering over the region X, system 200 may initiate a hidden component revealing process for the multiple hiding components, possibly revealing multiple components hidden by some or all of them (and possibly using different revealing methods or different visual effects or marking for different revealed components as described above).

Other effects as implemented by component manipulation handler 32 may include transparency handler 321 making a component slightly (10%) transparent and possibly only in relation to overlapped components satisfying the activation conditions. Alternatively, when the user operates on the component, it may become highly (e.g. 90%) transparent revealing the components which X layers down beneath it as long as the hiding component is being operated on (or based on some other transparency duration definition). It will be appreciated the transparency-modifying operations as applied by transparency handler 321 may thus enable the user to select previously hidden components.

Component manipulation handler 32 may also be activated when moving a component, resizing a component, rotating a component or indirectly modifying a component, all of which may be based on activation conditions. An example would be when component X's size or position is modified due to a modification to another component or element Y which affects component X through dynamic layout (as described U.S. patent Ser. No. 10/185,703 entitled "Web Site Design System Integrating Dynamic Layout and Dynamic Content" granted 22 Jan. 2019 and assigned to the common assignee of the present invention and incorporated herein by reference). For example, if the user types extra text into component Y which causes it to "grow down", pushing component X down, when component X moves, other components hidden by X may become somewhat visible.

Figure 9:
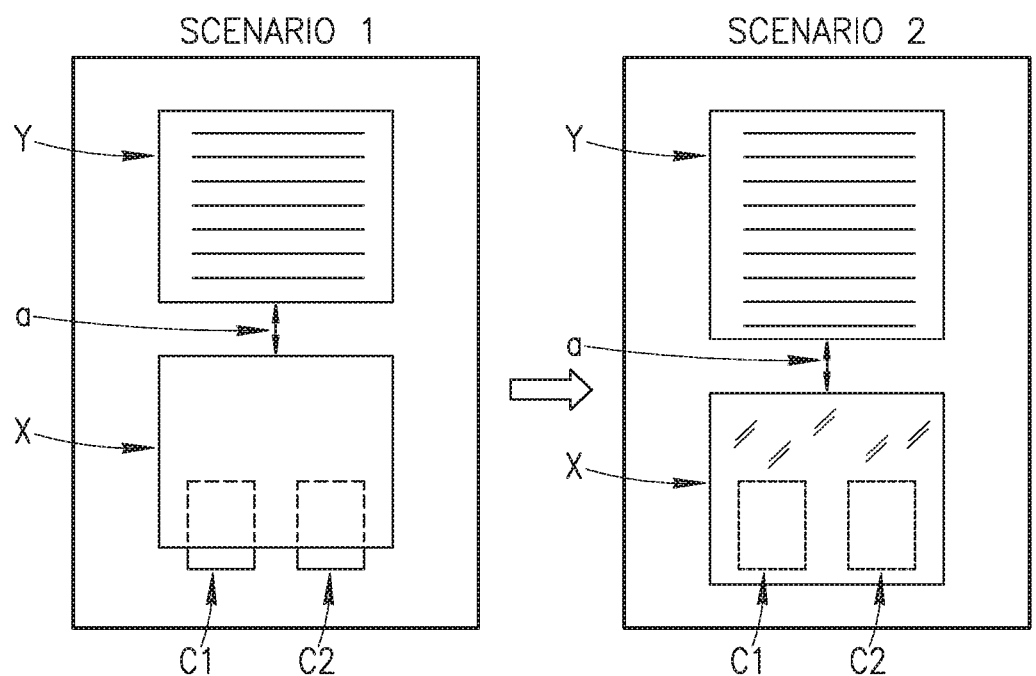
FIG. 9 is a schematic illustration of the integration of dynamic layout techniques when revealing a hidden component by the system of FIG. 4, constructed and operative in accordance with the present invention.

Reference is now made to FIG. 9 which illustrates how component Y expands downwards due to additional text being typed into it using dynamic layout functionality. Component Y "pushes" component X down via anchor [a] between Y's bottom edge and component X's top edge. Components C1 and C2 are partially visible in scenario 1, but are completely hidden by component X in its new position in scenario 2. Transparency handler 321 may mark X as slightly visible as the dynamic layout process is performed in order to make any future manipulation of C1 and C2 possible. Such a change may be temporary so as to allow C1 and C2 to be manipulated/corrected once the dynamic layout changes stop (i.e. no more text is added into component Y).

System 200 may use also use component-specific variants. It will be appreciated that system 200 may have full information about the edited/displayed components, including their type, parameters, structure, content and attributes. Thus, general behavior handler 323 may use an alternate or a modified component version for either overlapping or overlapped components when displaying it in "transparent mode". General behavior handler 323 may also apply such modifications to components at all z-order levels, as (for example) an overlapped component may itself overlap another component lower on the z-order. The displayed alternate version may include not just the component's frame area, but additional information (e.g. additional/modified component frame or content information) which may provide better context to the user when editing though a transparent display.

For example a frame component may include a sophisticated frame or bevel handling. However, the modified version may provide simpler frame/bevel information. Another example could be a video player displayed using an outline version of the video controls (possibly displaying a different set of buttons, button frames or UI variant in these controls).

In another example, a component may be a geometrical shape which also includes specific content (such as a specific fill pattern and color gradient). The modified version may use an outline version of the geometrical shape, rather than a simple enclosing rectangle.

In yet another example, the modified component may be displayed by WBS editor 30 (via component manipulation handler 32) with modified content (instead of or in addition to component frame modification), possibly generated based on processing or simplification of the original content. For example, an image component may be displayed with an outline version of the contained image (based on image analysis and feature extraction), which allows better visibility of overlapped components instead of the original "full" image. The capability may further be adapted to use monochrome or grayscale display instead of the original colors (thereby reducing the visual load to the user when viewing components hidden under said image).

Furthermore, the component may be also responsible for its own display, or at least provide information or hints to system 200 on how to display it. In such a case, modifications (such as the ones described above) may be implemented at the component level, the website building system level or both. As an example, component manipulation handler 32 may implement image analysis (e.g. feature extraction and simplification), and apply it to specific component instances based on hints provided by the component. A sophisticated component may provide not just hints but complete processing plug-ins which may integrate into such implementation and provide component-specialized functionality.

It will be appreciated that system 200 may use mixed 2D-3D representations. For example 3D display handler 324 may convert just the current "hiding" component area into a 3D display sub-area (occupying part of the page display) which can be manipulated using 3D operators. This would be easier to understand than converting the entire page (or the displayed screen area) into a 3D representation. The 3D displayed component subset may be limited (for example) by area, context, sub-hierarchy or other component relationships (e.g. displaying only the components intersecting a given area and their contained sub-trees).

It will be further appreciated that system 200 may also add one or more projections of the 3-dimensional site component structure to aid the user in editing, possibly avoiding the use of a 3D display which may be difficult to understand for some users. Such additional views or projections may be continuously updated while the main view is being updated, and may allow limited or full editing to be performed inside them. Alternatively, system 200 may use projection(s) display in conjunction with a full or partial 3D display (as described herein above).

Figure 10:
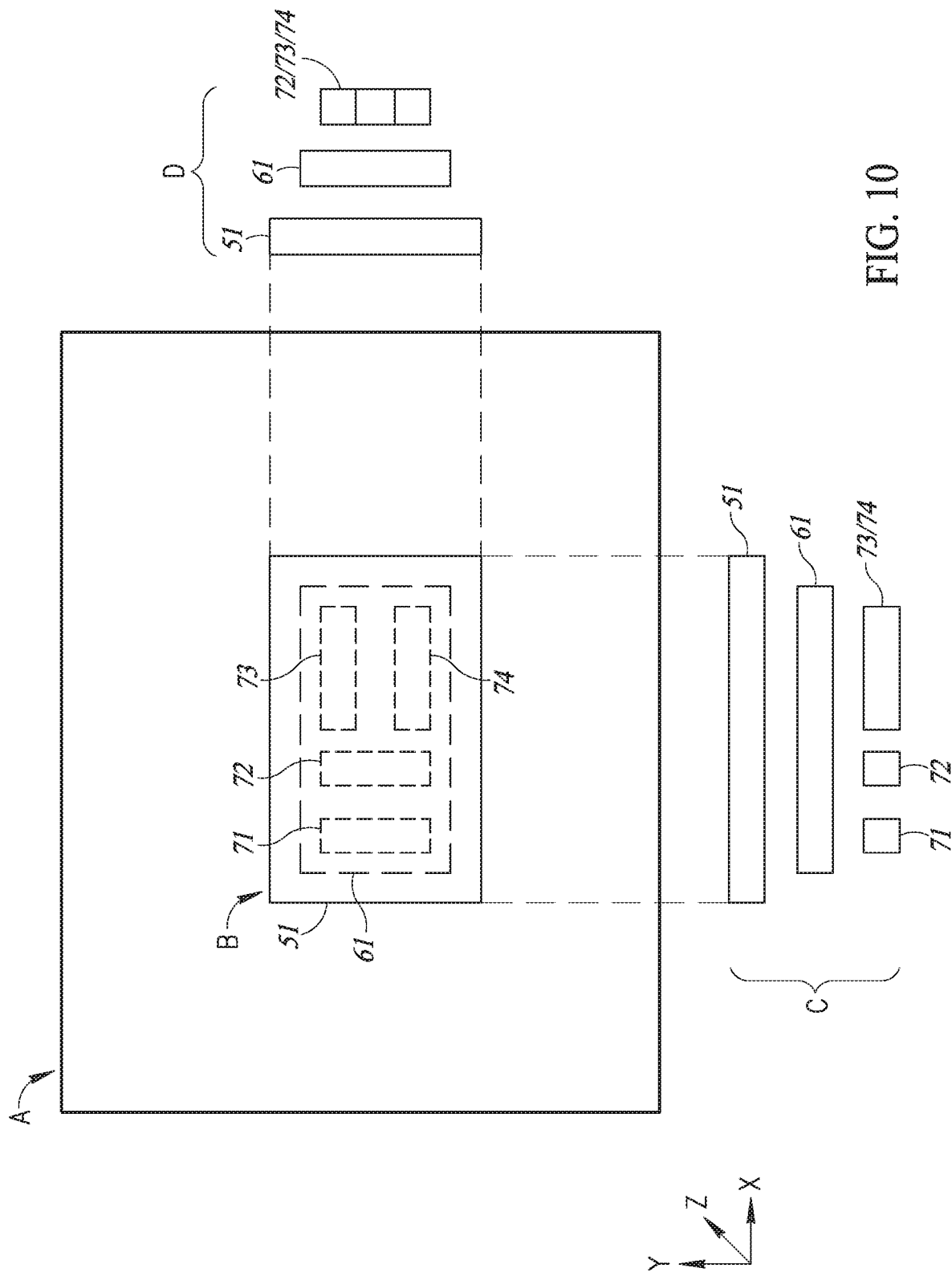
FIG. 10 is a schematic illustration of a horizontal and vertical projection of a webpage onto axes, constructed and operative in accordance with the present invention.

One example would be adding two side views. Reference is now made to FIG. 10 which illustrates a horizontal/vertical projection of the entire webpage onto axes. As is shown, the regular editing window [A] displays the typical view [B] of the edited components. Component 51 is visible and hiding under it is 2nd layer component 61 and 3rd layer components 71, 72, 73 and 74. As discussed here above, the 2nd/3rd level hidden components are drawn in dashed lines inside [B]. These hidden components are not actually visible to the user during regular editing (though they may be made visible though the features of system 200).

It will be appreciated that the component arrangement is positioned in 3D space, with the X axis being horizontal and the Y axis being vertical (as illustrated), and the Z axis being going up/down "into/from the screen". Thus the different views illustrated include:

View [C] (y side view), showing how the components would be projected into a X-Z plane located at y=(− infinity); and View [D] (x side view), showing how the components would be projected into a Y-Z plane located at x=(+ infinity).

In these projections, some or all of the hidden components may be visible, and in fact new hiding relationships may occur. For example, in view [C] it can be seen that component 74 now hides component 73. In view [D] components 73 and 74 partially hide component 72 which in turn hides component 71.

It will be appreciated that side display handler 325 may create a simplified side view similar to the main view but simple enough for the user to select components more easily. It will be further appreciated that however simplified they may be, they may still have hiding relationships, and may still require dynamic transparency processing. In fact, being 2D and given that websites are typically designed so that objects are aligned on an X-axis-parallel or Y-axis-parallel line, there would potentially be more exact-position overlaps in the side views than the regular view. In general, the elements of component manipulation handler 32 may all modify the underlying data structure (used for 3D/side display) so as to support selection in these displays. It will be further appreciated that there could be different transparency requirements for each of the displays (main view, 3D view, side view*2) which would require different changes to the underlying data structure. This could be resolved by correcting according to the view the user is focused on (e.g. detected via mouse position, eye movement tracking etc.) or having a rendering or display system which may create multiple views of the same underlying data structure based on multiple "layers" of modifications.

Side display handler 325 may operate on these side views (to "un-hide" components) in the same way as it does in the main view. Thus, for example, when the user hovers with the mouse over the projection of component 74 in view [C], side display handler 325 may make component 74 transparent inside view [C] displaying the hidden component 73.

Figure 11:
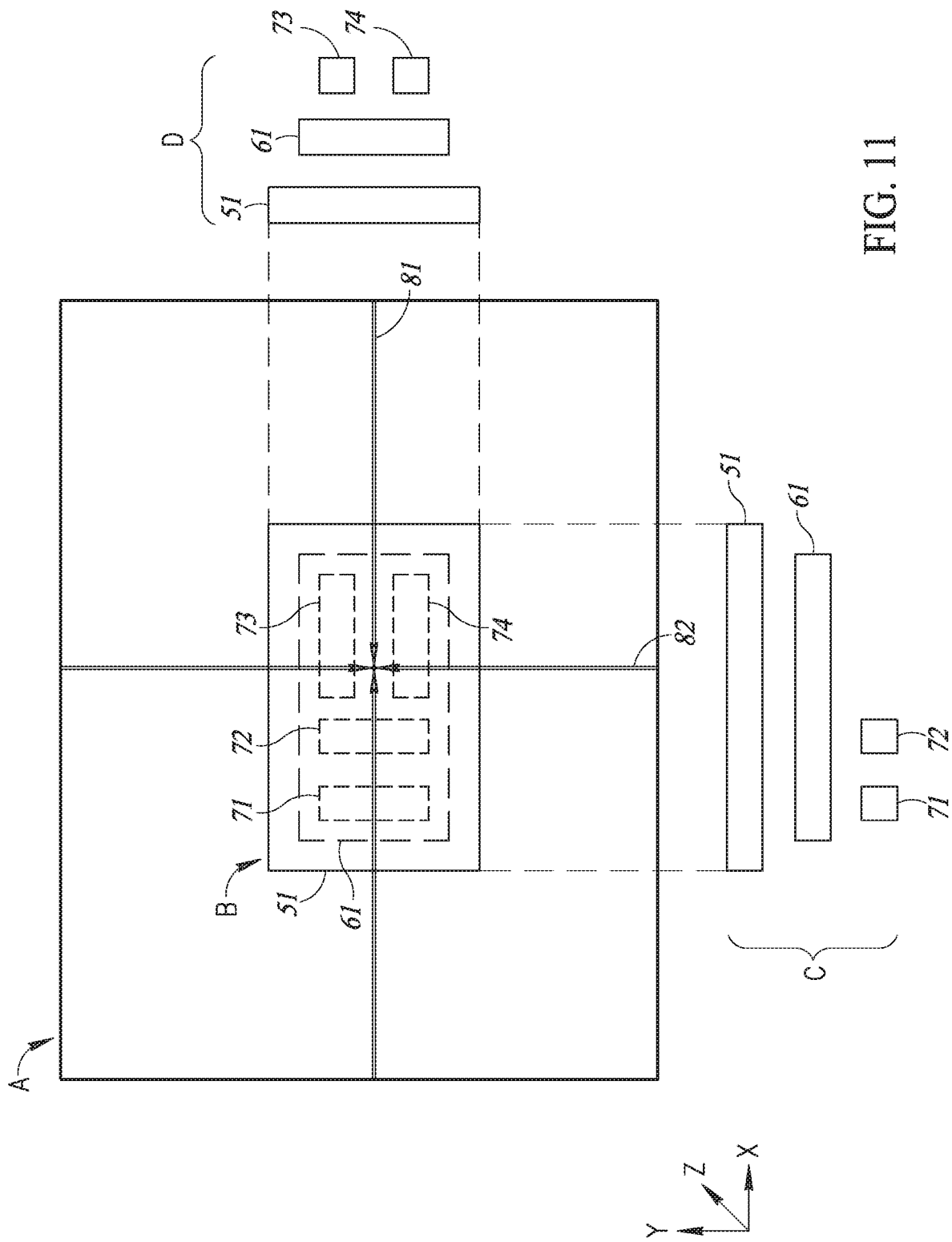
FIG. 11 is a schematic illustration of a generated display based on cutting X/Z and Y/Z vertical planes at a cursor point of a webpage, constructed and operative in accordance with the present invention.

Side display handler 325 may also apply cut lines, i.e. horizontal and/or vertical lines which may be attached to the cursor position. Reference is now made to FIG. 11 which uses the same component configuration as FIG. 10. However, in this scenario, the side views reflect the intersections between the components and planes based on the cut lines (instead of a projection to plus/minus infinity as before). For example:

The X-Z plane is based on the horizontal cut line 81 (shown in side view [C]) and The Y-Z plane based on the vertical cut line 82 (shown in side view [D]).

The two cut lines 81 and 82 may intersect at the mouse position.

As can be seen in FIG. 11, side view [C] does not show components 73 or 74 (which do not intersect cut line 80), and side view [D] does not show components 71 or 72 (which do not intersect cut line 81).

It will be appreciated that the specific components shown in any side view may change dynamically as the user moves the cursor (and the cut lines) to reflect the updated set of intersecting components. System 200 may also implement hidden component handling in the cut-line based side views as for the main view as described herein above.

Side display handler 325 may also provide alternative mechanisms for the user to move the cut lines, such as dragging them using the mouse (without having the cut lines constantly anchored to the cursor position).

General behavior handler 323 may also apply changes to hiding/hidden components, e.g. by changing object sizes to allow better differentiations. For example, component A hides component B when component A and component B have an identical or very similar size in one or both dimensions (or otherwise overlapping or almost-overlapping edges). General behavior handler 323 may make component B somewhat smaller (affecting also components contained in component B) so as to provide a better differentiation between components A and B.

Other changes may include changing colors or fill patterns to create better contrast. For example, component A hides component B and both are filled with a similar shade of yellow. Even if component A is made somewhat (or even fully) transparent by transparency handler 321, it would still be difficult to see component B. Thus, general behavior handler 323 may (temporarily) change the shades of component A and/or component B to create contrast between the two. It will be appreciated that such color/fill pattern changes may require performing a global analysis of component visibility, hiding and geometrical relationship to find which colors should be differentiated based on an algorithm similar to a map coloring algorithm but modified to the website building system component hierarchy space, which is in fact 3 dimensional and not 2 dimensional like a regular map. Such an algorithm may be further modified in that it would not generate an arbitrary assignment of colors (to the various components), but rather an assignment of colors which attempts to be as close as possible to the original component colors. Furthermore, the assignment may take into account that different areas of a single component may have multiple colors or color ranges (e.g. with components using gradient-based fill or displaying an image). Thus, color assignment may require splitting of components into sub-elements (so as to support multiple color components) and use of an optimization-based graph coloring algorithm with "proximity to original colors" metric added to the optimization.

General behavior handler 323 may also move components aside to "allow more space" for the area under consideration. This may be combined with dynamic layout processing to better preserve the general design of the page (e.g. by moving components as required, and moving additional components so to preserve the general design of the page).

Another change may be shape modification (e.g. based on modifying the underlying page grid/coordinate system). General behavior handler 323 may apply shape modification to the reviewed area so as to make selection easier and remain in context. This is different from a regular magnifier function used by the UI (e.g. for the visually impaired) as no components are hidden by the magnified area.

General behavior handler 323 may perform shape modification based on the component definitions provided by the website building system (as determined by component visibility determiner 82) which may include hints on how to render them in a modified manner.

Figure 12:
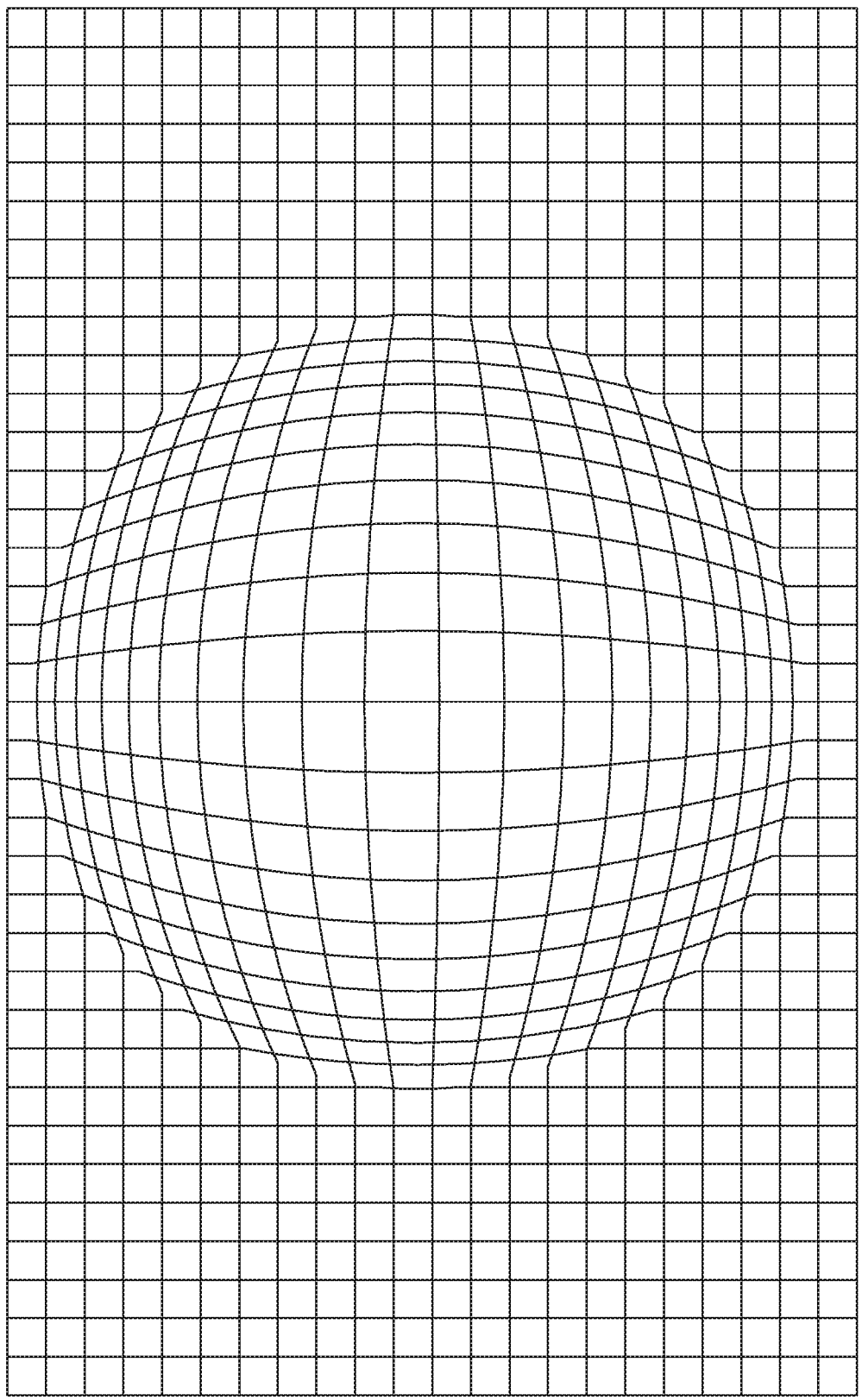
FIG. 12 is a schematic illustration of a fish eye grid, constructed and operative in accordance with the present invention.

This could be done, for example, using a "fisheye lens inside picture" modification involving non-rectangular pixels, essentially transforming the displayed area so as to use a non-rectangular grid (as is illustrated in FIG. 12 to which reference is now made). An example of the result of such a process can be seen in M. C. Escher's famous painting "Balcony".

General behavior handler 323 may apply an automatic zoom or pan to help the user review the area, e.g. by zooming and/or panning the view(s) as appropriate and focusing on the relevant hiding/hidden components.

It will be appreciated that component manipulation handler 32 may apply different handling for different parts of components. For example, use different degrees of transparency for different areas.

It will be appreciated that system 200 may use enhanced frames for its components. For example, instead of showing just the frame of a hiding or hidden object, WBS editor 30 may display an enhanced frame, which includes some of the content/fill color/fill pattern of the object, providing more context to the editing user.

Figure 13:
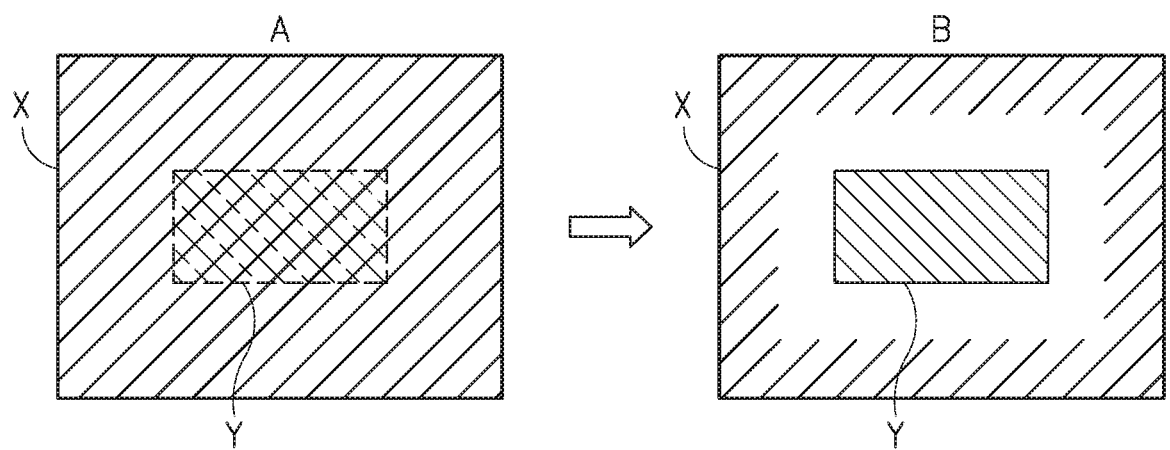
FIG. 13 is a schematic illustration of the display of a webpage using an enhanced frame, constructed and operative in accordance with the present invention.

Reference is now made to FIG. 13 which illustrates a display using an enhanced frame. As is shown, general behavior handler 323 may replace display A in which a component [y] is hidden under a component [x] which has a fill pattern with display B, in which [x] is modified so as to show only part of the filling pattern near its frame, and thus expose component [y]. Such intelligent exposure may extend to more than 2 levels.

In an alternative embodiment, general behavior handler 323 may also clip parts of the contained text inside a text component which hides another component.

It will be appreciated that system 200 may also support explicitly hidden (ExH) components. ExH components are components which are meant to be hidden during regular site viewing. They are still typically visible in the editing stage, though they may be overlapped based on their z-order. There may be 2 types of such ExH components, administrative type ExH components which serve as administrative (rather than visual) functionality, such as DB connectors and event routers and visual type ExH components which are marked as hidden (e.g. through a design attribute or a procedural operation performed by the page) and are kept as such during runtime. Such components may be made visible to the end-user under specific conditions, for example, by an operation performed by system 200 as a result of activation by a trigger. These are typically "reserve" components (e.g. a pop-up box not visible under regular conditions) or alternate design variants or existing components.

System 200 may allow ExH components to have a z-order value even if hidden. The activation rule may be "if this ExH component is made visible, its z-order will be X".

System 200 may handle E×H components in various ways. For example, system 200 may treat E×H components as it treats other components (e.g. making them visible based on the activation rules as described herein above) while still be invisible during run-time (unless "popped up" during run-time as noted above). It will be appreciated that the activation conditions may be differently structured, as the E×H component is hidden even when there is no overlapping component (e.g. by referring to the entire page as an "overlapping component").

Alternatively, system 200 may ignore the E×H components completely, i.e. not modify their visibility (or the visibility of the components overlapping them) regardless of the user's behavior during editing.

In an alternative embodiment, system 200 may support E×H components which are hidden during editing (e.g. so as not to encumber the editing stage) but are still visible in run-time and function as regular components in run-time. System 200 may provide additional types of UI to allow components to be switched to and from this type of explicitly hidden state.

It will also be appreciated that system 200 may use any of the techniques above to show components that are "scrolled out" inside a container containing them. This is needed if a container has a contained area which is larger than its frame, and some of this (regularly invisible) contained area bears components that are not visible in regular use unless the user is allowed to "scroll to them". Such scrolling may be geometrical scrolling over a larger-than-frame "internal surface/page", or may involve scrolling/switching between multiple members of a multiple-page container (such as a carousel which contains multiple component-bearing pages).

System 200 may also use all of the techniques above as performed by component manipulation handler 32 to show information or page elements external to the components, such as dynamic layout anchors (as described in U.S. Pat. No. 10,185,703) or semantic relationships (as described in in U.S. Pat. Nos. 10,176,154 and 9,747,258 entitled "System and Method for the Creation and use of Visually-Diverse High-Quality Dynamic Layouts" granted 29 Aug. 2017 both of which are assigned to the common assignee of the present invention and incorporated herein by reference). Such relationships are not displayed in regular use (as they would disrupt the WYSIWYG (What You See Is What You Get) nature of most visual editors).

3D display handler 324 may also use mixed 2D-3D representations, for example 3D display handler 324 may convert just the current "hiding" component area into a 3D display sub-area (occupying part of the page display) which can be manipulated using 3D operators. This would be easier to understand than converting the entire screen into a 3D representation.

It will be appreciated that component manipulation handler 32 may also use any combination of the capabilities as described herein above.

It will also be appreciated that system 200 may enable users with the ability to toggle between the different viewing modes, so that in one mode discovery of overlapped components is easy, and in the other is less intrusive. In the later mode the overlapped component would not get in the way of editing.

Thus system 200 may enable visual editing of a website/visual application page having a complex composition consisting of multiple components, based on component, user and system data and an analysis of component relationships together with activation rules in order to accordingly display hidden/overlapped components accordingly.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website building system (WBS), said WBS comprising:
   at least one processor;
   a WBS editor running on said at least one processor configured to receive edits from a user to a website built with said WBS, said website having at least one webpage with regular components, overlapped components, and visually obscured components in a webpage view; said WBS editor to further receive coordinates of at least one overlapped or visually obscured component (OOVOC) for editing according to a location of an input device of said user; and
an editor overlap handler running on said at least one processor to adjust the view of said at least one OOVOC from said webpage view to a webpage editing view according to activation conditions which are a function of said coordinates, at least one of: semantic and geometric relationships between said at least one OOVOC and other components on said at least one webpage of said website and predefined rules on related information about said interactions of said user with said website,
wherein said webpage editing view is one of: 2D, 3D and side view.

2. The system of claim 1 wherein said geometric relationship is at least one of: hierarchical, inter-page component associations and size of overlap.

3. The system of claim 1 wherein said webpage editing view comprises at least one of: transparency and z-order.

4. The system according to claim 1 and also comprising at least one repository to store activation rules for said activation conditions, properties of said regular components and of said at least one OOVOC.

5. The system according to claim 1 and wherein said WBS editor further comprises a component manipulation handler to modify visual attributes of said at least one OOVOC according to said editor overlap handler.

6. The system according to claim 5 wherein said component manipulation handler comprises at least one of:
a transparency handler to make said at least one OOVOC at least one of: transparent and semi-transparent;
a z-order handler to modify or preserve the z-order between said regular components, and said at least one OOVOC of said webpage;
a general behavior handler to change attributes of said at least one OOVOC according to at least one of: shape modifications, zooming, resizing, moving, clipping, dynamic layout, content changes, frame changes, changes in fill and color;
a 3D display handler to convert said at least one overlapped or visually obscured component into a 3D display; and
a side display handler to cut and create a simplified side view of said at least one OOVOC.

7. The system according to claim 1 wherein said input device comprises at least one of: a mouse, a trackball, a digitizer input device, physical human motion detection, a biometric parameter reader, a 2D pointing device and a 3D pointing device.

8. The system according to claim 1 wherein said editor overlap handler comprises:
a data gatherer to gather information on said regular components, and said at least one OOVOC of said webpage from at least one of: at least one database, non-system elements and systems external to said system;
a component relationship analyzer to analyze said least one of: semantic and geometric relationships; and
a component visibility determiner to determine said webpage editing view and activation conditions from the output of said data gatherer and said component relationship analyzer.

9. A method for a website building system (WBS); the method comprising:
receiving edits from a user to a website built with said WBS, said website having at least one webpage with regular components, overlapped components, and visually obscured components in a webpage view;
receiving coordinates of at least one OOVOC for editing, according to a location of an input device of said user;
adjusting the view of at least one of said at least one OOVOC from said webpage view to a webpage editing view according to activation conditions which are function of said coordinates, semantic and geometric relationships between said at least one OOVOC and other components on said at least one webpage of said website and predefined rules on related information about said interactions of said user with said website,
wherein said webpage editing view is one of: 2D, 3D and side view.

10. The method according to claim 9 wherein said geometric relationship is a least one of: hierarchical, inter-page component associations and size of overlap.

11. The method according to claim 9 wherein said website editing view comprises at least one of transparency and z-order.

12. The method according to claim 9 and also comprising storing activation rules for said activation conditions, properties of said regular components, said at least one OOVOC.

13. The method according to claim 9 wherein said adjusting the view further comprises modifying visual attributes of said at least one OOVOC.

14. The method according to claim 13 wherein said modifying visual attributes comprises at least one of:
making said at least one OOVOC at least one of: transparent and semi-transparent;
modifying or preserving the z-order between said regular components, and said at least one OOVOC of said webpage;
changing attributes of said components according to at least one of: shape modifications, zooming, resizing, moving, clipping, dynamic layout, content changes, frame changes, changes in fill and color;
converting said at least one OOVOC into a 3D display; and
cutting and creating a simplified side view of said at least one OOVOC.

15. The method according to claim 9 wherein said input device comprises at least one of: a mouse, a trackball, a digitizer input device, physical human motion detection, a biometric parameter reader, a 2D pointing device and a 3D pointing device.

16. The method according to claim 9 wherein said adjusting the view comprises:
gathering information on said regular components, said at least one OOVOC of said webpage from at least one of: at least one database, non-system elements and systems external to said system;
analyzing said least one of: semantic and geometric relationships; and
determining said webpage editing view and said activation conditions for the display of said at least one OOVOC according to the output of said gathering information and said analyzing.

* * * * *